United States Patent
Reitter

[15] 3,703,344
[45] Nov. 21, 1972

[54] INTERNAL COMBUSTION ROTARY ENGINE

[72] Inventor: Teodoro Reitter, Fray Justo Sarmiento 2507, Buenos Aires, Argentina

[22] Filed: Jan. 27, 1971

[21] Appl. No.: 110,114

[30] Foreign Application Priority Data

Jan. 30, 1970 Argentina...................226719

[52] U.S. Cl. .........................418/61, 418/65, 418/67, 418/184
[51] Int. Cl............F01c 1/02, F03c 3/00, F04c 1/02
[58] Field of Search....418/61, 62, 68, 184, 251, 224, 418/65, 67, 183, 138; 123/8.49

[56] References Cited

UNITED STATES PATENTS

| | | | |
|---|---|---|---|
| 822,700 | 6/1906 | Steele | 418/61 |
| 1,350,159 | 8/1920 | Johnson | 418/61 |
| 1,935,096 | 11/1933 | Muller | 418/61 |
| 1,961,592 | 6/1934 | Muller | 418/61 |
| 2,859,911 | 11/1958 | Reitter | 418/61 |

*Primary Examiner*—Carlton R. Croyle
*Assistant Examiner*—John J. Vrablik
*Attorney*—Kenyon & Kenyon Reilly Carr & Chapin

[57] ABSTRACT

An improved internal combustion rotary engine, of the kind wherein a housing contains in a cylindrical bore a control body effecting an oscillating cycle creating a series of combustion chambers, has at least three crank-shaped bodies placed intermediate the contacting surfaces between the end covers of said cylindrical bore and the central body sides; said crank-shaped bodies are equidistantly arranged, partially and freely housed in respective recesses hollowed out in said covers, eccentric appendices of which, jutting out from the surfaces thereof, are freely included within respective recesses hollowed out from the central body sides, said central body also having radially and equidistantly arranged a plurality of swivelling dividing bodies associated with the surface of the housing internal cylindrical space; each of said dividing bodies, having a parallelepiped quadrangular and flattened configuration, is integral with a basic semi-circular cross-section body, freely included in a corresponding hollow of coincident cross-section cut off from the central body, while the upper portion of said dividing body swivellingly enters into a space offered by a further head body, also having a semi-circular cross-section and equally included in a coincident cross-section hollow existing in the housing wall; said dividing dividing basic and head bodies being interiorly provided with conduits associated with exhaust and injection operations.

3 Claims, 5 Drawing Figures

INVENTOR
TEODORO REITTER

INVENTOR
TEODORO REITTER 3,703,344

INTERNAL COMBUSTION ROTARY ENGINE

BACKGROUND OF THE INVENTION

This invention relates to a rotary type internal combustion engine, to which various improvements have been incorporated for the purpose of increasing functional efficiency, power and revolutions per minute, as well as to prevent vibration, reduce the structure and eliminate to a maximum degree frictional wear.

It is already known that this type of engine essentially consists in a housing or block having interiorly a cylindrical cavity within which a central body operates, said central body having a similarly cylindrical or a spheroidal triangular configuration, coaxially free with respect to the eccentric portion of a crankshaft constituting the drive shaft. This central body, which is thus eccentric relative to the block cavity housing it, effects, due to expansion and compression forces caused by combustion, an oscillating cycle which, while creating a succession of combustion chambers and compression chambers, moves the crank-shaft thus obtaining in the rest of the shaft the desired rotary movement. The aforementioned combustion chambers are defined by contact points which the central body effects against the central cavity wall in the oscillating cycle thereof, a circumstance which logically causes a friction moment between both parts, with consequent wear. This oscillating cycle is due in these known cases exclusively to the eccentric action of the crankshaft.

SUMMARY OF THE INVENTION

One of the inventive improvements incorporated is precisely related to a means adapted to control the oscillating cycle so that it will at all times be regular and uniform, while maintaining at the same time a close synchronic relationship with rotation of the crankshaft eccentric portion. The damaging friction moment has thus been eliminated, since the surfaces of these parts do not come into contact. Another of the improvements to which reference is made above, and which is a consequence of the first, comprises establishing between the combustion chambers originated in said eccentricity the required seal which was obtained in the prior art through contact between both bodies, in such a manner that combustion in each of the combustion chambers, as well as expansion, compression, injection and exhaust, are totally useful.

In this aspect a fully favorable result has been obtained. The extended tests which have been conducted have shown extremely satisfactory ratings: greater power per kilogram, over 15,000 rpm and complete absence of vibration. These are conditions making this engine suitable for operation in any type of machines, motor vehicles, aircraft and motorboats of any size. And very specially, on account of the reduced dimensions, light weight and extremely large values in respect of power and speed.

In order to provide for a better understanding of the above improvements in their double constructive and operative aspects, a detailed description is given below, reference being had to the accompanying illustrative drawings.

DESCRIPTION OF THE PREFERRED EMBODIMENT

Figure 1:
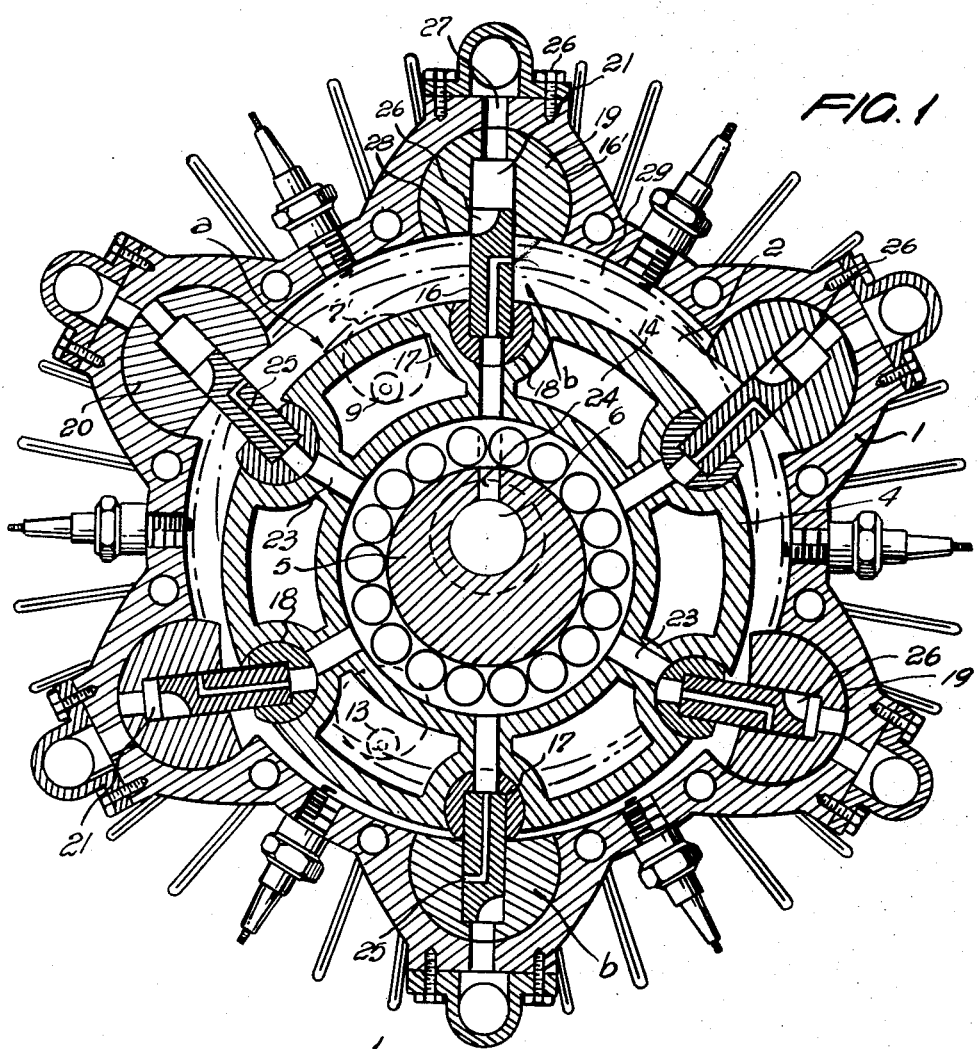
FIG. 1 is a cross-sectional view of a rotary engine in which the above referred improvements have been incorporated.

In all figures, equal or equivalent parts and componentes are designated with the same reference letters or characters, in order to duly associate the drawings with the description of preferred embodiment of the invention which follows.

Before going into the matter, it is noted that no reference shall be made herein to ignition, carburation, injection, lubrication or cooling systems, since these are all known means which are common to all internal combustion engines, and for such a reason they have not been illustrated in the drawings. At the same time, it should be stated that injection may be made by a compressor of any suitable type.

The essential structure in this system of internal combustion engines is comprised of a block formed by an intermediate casing 1, surrounding a central cylindrical space 2 closed at both ends by covers 3. Inside the space 2 a central body 4 is located, which central body by being coaxial with eccentric portion 5 of crankshaft 6, is equally eccentric relative to the internal space 2. As generally anticipated, one of the improvements characterizing the present invention is constituted by crank-shaped elements (a), which in a number of three at least must be equidistantly arranged, following a circular line, between the inner sides of covers 3 and parallel side surfaces of central body 4. Each of these elements (a) consists in a cylindrical and flattened body 7, from one of whose faces a perpendicular cylindrical appendix 8 is coaxially projected, while from the opposite face a second similar but eccentric appendix 9 is extended. Covers 3 present respective recesses 10 and 11 wherein the elements (a) are received and execute their rotary displacement through inclusion therein of the bodies 7 and their coaxial appendices, respectively, the latter serving as axes for said rotation. Eccentric appendices 9 thus jut out over the internal surfaces of covers 3 and are included in the inside of registering recesses 12, opened from both side surfaces of central body 4, which are tangential with those in covers 3 and with faces 7' of elements (a). The constructive form described shows that the oscillating cycle effected by central body 4 is governed by the eccentricity of appendices 9 in elements (a), said action cooperating with the action of eccentric portion 5 of crankshaft 6, since they tend to absorb vibration originated in the violent displacement of the eccentric mass. Elements (a) are also provided interiorly with a conduit 13 having an inlet through passage 11' bored through cover 3 and an outlet coaxial with eccentric appendix 9 entering through opening 12 inside internal chambers 14 in central body 4. The purpose of these conduits is to channel a flow of cooled and, at the same time, lubricating oil. Respective branches 15 parting from conduits 13 and opening into perimeter bands of bodies 7 serve for lubricating the rotary movement of these elements (a), within corresponding recesses 10.

Figure 2:
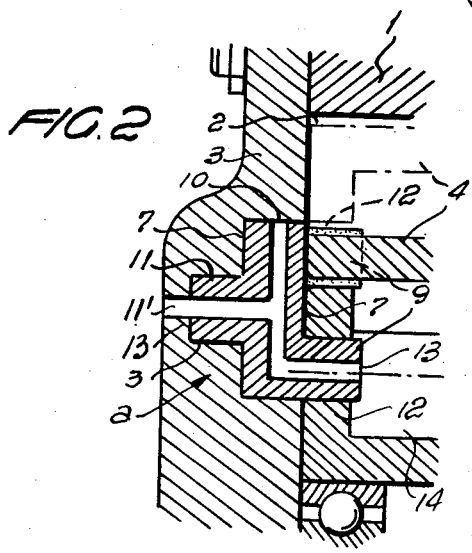
FIG. 2 is a partial cross-sectional view of the engine of FIG. 1, showing the location given to the means designed to control the oscillating cycle effected by the eccentric central body.
Figure 3:
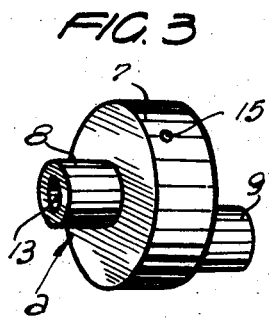
FIG. 3 is a perspective view of the eccentric element controlling the oscillating cycle to which reference is made in FIG. 2.
Figure 4:
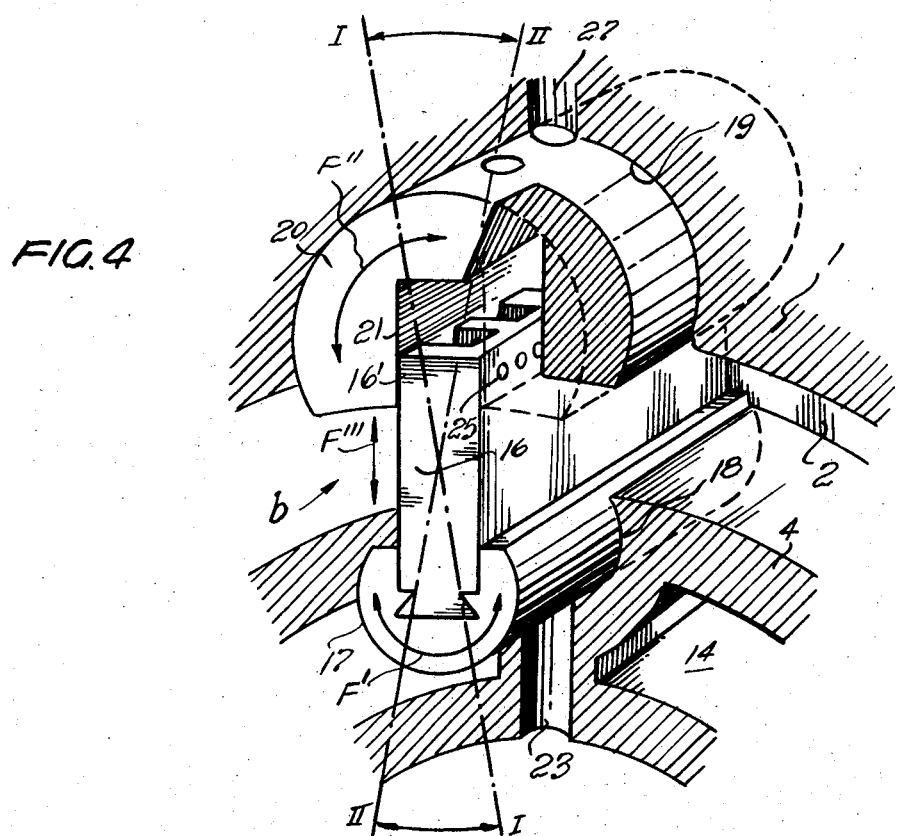
FIG. 4 is a perspective view of a means for dividing the combustion chambers, and of the oscillating means linking the dividing means with the external housing and the eccentric central body of the engine, axial lines showing the possibility of displacement motion the assembly possesses. Conventional sections have been made in this Figure to show significant parts of the invention.
Figure 5:
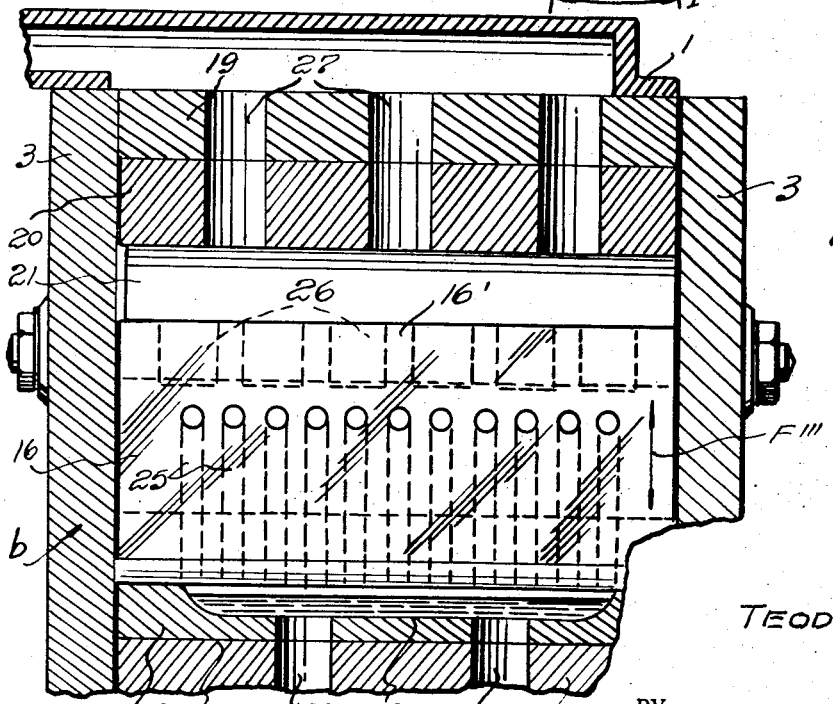
FIG. 5 shows an elevational end view of a dividing means, with parts of the housing and the central body cut away showing injection and exhaust conduits.

It is noted that the oscillating cycle of central body 4 has been pre-established in such a manner that the latter will not contact the wall surrounding space 2 in housing 1. Therefore, this fact will prevent indispensable combustion chambers from forming. Accordingly, it is necessary to establish a means that will define and seal these spaces and allow formation of the chambers. This is achieved by means of dividers (b), radially and equidistantly arranged, having lateral and, at the same time, alternating linear movements, all of them capable of adapting their sealing action to the oscillating cycles of central body 4. To such effect, each of these dividers (b), constituted by respective longitudinal flattened parallelepiped quadrangular bodies 16, which are integral with corresponding longitudinal bases 17 of semicircumferential cross-section which encompass an arc substantially over 180°. The bases 17 are freely included, although retained, within respective registering hollows 18 cut from the surface of central body 4, and are equidistantly and axially parallel to the central axis thereof. In turn, housing 1 has similar semicircular hollows 19 in its inner wall, within which respective longitudinal coincident action bodies 20 operate, providing throughout their entire length, from their flat surfaces, quadrangular spaces 21 within which upper portions 16' of dividers (b) are received and move with a swivelling displacement. Due to the features of the basic 17 and opposed 20 bodies, which are similar in respect of the possibilities of rotation by free inclusion within hollows 18 and 19, respectively, the bodies 16 of dividers (b) are enabled to adopt with no difficulties at all the arrangements shown in FIG. 4. Along axis lines I—I and II—II, thanks to the rotational movement, indicated by arrow F', which basic body 17 effects by oscillating displacement of central body 4, this movement is translated into movement of body 20 (as shown by arrow F''). This adaptation action is completed by the alternating linear movement (indicated by arrow F'''), effected by body 16 in its end portion 16' included within registering recess 21 in body 20. It should be observed that the length of bodies 16, bases 17 and opposed bodies 20 are of a constant dimension and in accordance with the width of space 2 in the housing, so that their flat ends are parallel to the internal surfaces of covers 3 in order to preserve at all times the airtightness of the combustion chambers (see FIG. 5). It should also be noted that these dividers (b) are interiorly provided with conduits adapted to operate the rotor operative cycle. To such effect, basic bodies 17 have a collector (manifold) space 22 for receiving the fuel-air mixture which is injected through passage 23 in central body 4 which at a given moment communicates through port 24 with the inside of shaft 6 which is hollowed and through which the fuel-air mixture coming from the compressor (not shown) is injected. From the manifold space 22 conduits 25, opening into the corresponding combustion chamber (see FIG. 2), branch out through body 16. In the surface opposite to the outlet of the conduits 25, bodies 16 are provided from their upper edges downwards with castellated notches 26 adapted to expedite exhaust of combustion gases through exhaust conduits 27 bored in housing 1. The scavenging operation of the engine is represented in FIG. 1. At the point of widest separation between the surfaces of central body 4 and the inside wall of housing 1, it is seen how divider (b) has descended down to its extreme possibility so that upon exceeding the lower limits of castellated notches 26 the edge of the flat section or base of body 20 a passage 28 is formed allowing expulsion of combustion gases (exhaust), which may pass through space 21 and conduits 27 towards the atmosphere. At the same time, due to registering of port 24 in shaft 6 with passage or conduit 23 in central body 4, the fuel-air mixture comes along conduits 25 to chamber 29 for combustion by known means.

The engine of this invention operates according to the two-cycle principle and may be constructed to use gasoline in the conventional way and also to use heavy fuel by the Diesel principle. This last is considered to be the most convenient due to its advantage and economy in construction, smooth running, power/weight relationship, etc.

As inferred from the previous description, the only rotating parts are crankshaft 6 and elements (a), the crankshaft being dynamically balanced in the conventional manner. Central body 4 does not rotate, it only moves radially due to the excentricity of crankshaft 6, and is also dynamically balanced.

The scavenging that is performed in conventional engines through ports at the bottom of the cylinder, in the present engine is carried through bodies 16 of dividers (b). The working cycle is the same as that of all two-strokes engines. The discharge of burnt gases must be aided by means of pressurized air, as the atmospheric pressure is not sufficient to this end. The pressure can be obtained through a common blower as in all two-stoke engines, the air from the blower entering through crankshaft 6 and being distributed by passages 23. The scavenging portion is shown by the upper dash-and-point line in FIG. 1, covering an angle of approximately 60°, as in all two-cycle engines.

During the scavenging period, the gases pass through channels in the central body 4, where the bases 17 of dividers (b) are placed, the gases then enter the series of channels 26. These channels 26 open at their ends, freeing the way for the combustion gases into the channels of bodies 20 and casing 1, from where they are expelled through exhaust conduits 27. After this, crankshaft 6 connects the exhaust conduits 27 with a fresh air source in order to feed the combustion chamber with fresh air and push the residual combustion gases into the exhaust conduits, after which a new cycle begins.

The engine of the invention may be refrigerated in the following way: casing 1 by means of refrigerating fins (which are not shown) and the usual blower; and central body 4 by refrigeration with recirculating oil which enters cooling chambers 14 through elements 5 (a), going out through an opposite element and, after being collected from the six discharges, the hot oil is passed through a filter and then enters a radiator from which it is discharged into a deposit that is connected to a pump which sends the cooled oil again into the engine. Further to its cooling mission, this oil also lubricates the moving parts such as bodies 20 through a plurality of channels in central body 4, bases 17, bodies 16 and 20. These channels are not shown in the drawings so as not to make them confused. In order to assure an efficient lubrication, the oil in cooled chambers 14 is maintained under pressure which can be regulated by means of a control valve placed at the outlet of the oil stream.

All accessory devices, such as spark-plugs, nozzles, ignition coils, pumps, radiators, etc. with the exception of the distributor, can be those used in conventional internal combustion engines.

From the foregoing description and attached drawings the advantages from constructive and operative points of view of the improved internal combustion rotary engine clearly arise, it being considered unnecessary to enter into a more detailed explanation of the inventive idea, with the sole exception of expressly stating that the inventor claims the right to introduce subsequent changes and modifications as to detail without departing from the spirit and scope of the invention, as fully defined in the attached claims.

What is claimed is:

1. An improved internal combustion rotary engine including a housing having an interior cylindrical space; an end cover at each end of said interior space of said housing; an eccentric central body housed within said space and having flat sides parallel to said covers; at least three intermediate crank-shaped bodies equidistantly arranged between said covers and said central body partially and freely housed in respective recesses hollowed out in said covers, each body having an eccentric appendix jutting out from one surface thereof and freely included within respective recesses hollowed out from said flat sides of said central body; a plurality of swivelling dividing bodies radially and equidistantly disposed on said central body in spaced relation with the surface of said cylindrical space, each of said dividing bodies having a parallelepiped quadrangular and flattened configuration; a basic semicircular cross-section body integral with each dividing body and freely included in a corresponding hollow of coincident cross-section in said central body; a head body having a semicircular cross-section and included in a coincident cross-section hollow existing in said housing; said head body having a space swivelling receiving an upper portion of said dividing body; said dividing, basic and head bodies comprising separate conduit means for receiving inlet fluid and for discharging exhaust fluid.

2. An improved internal combustion rotary engine as claimed in claim 1, characterized in that each of the bodies intermediate between the cover surfaces and the rotor sides are comprised of a cylindrical and flattened central body from one of the faces of which a cylindrical appendix is perpendicularly and coaxially projected, while from the opposite face a similar but eccentric appendix protrudes, said bodies being internally provided with a through conduit which is coaxial to and interiorly communicated with both said appendices.

3. An improved internal combustion rotary engine as claimed in claim 1, further characterized in that both the hollows cut out from the rotor surface and the recesses in the inside surfaces of the housing, as well as the basic and head bodies respectively included in the same, present cross-sectionally a semi-circumferential arc substantially above 180°.

* * * * *